United States Patent [19]
Roerty et al.

[11] 3,778,712
[45] Dec. 11, 1973

[54] LINEAR SCALE MEASURING INSTRUMENT HAVING PREASSEMBLED COIL SUPPORT FRAME

[75] Inventors: Dennis F. Roerty, Bayonne; Robert C. MacIndoe, Chatham, both of N.J.

[73] Assignee: Westinghouse Electric Corporation, Pittsburgh, Pa.

[22] Filed: July 6, 1972

[21] Appl. No.: 269,352

[52] U.S. Cl. ............................................... 324/151
[51] Int. Cl. .............................................. G01r 1/16
[58] Field of Search ................. 324/150, 151, 151 A

[56] References Cited
UNITED STATES PATENTS
3,569,832   3/1971   Marusek et al. ..................... 324/150
2,537,221   1/1951   Hickok ............................. 324/151 R

*Primary Examiner*—Alfred E. Smith
*Attorney*—A. T. Stratton et al.

[57] ABSTRACT

An improved DC electrical measuring instrument which is easily assembled and which has a linear scale.

13 Claims, 10 Drawing Figures

LINEAR SCALE MEASURING INSTRUMENT HAVING PREASSEMBLED COIL SUPPORT FRAME

BRIEF SUMMARY OF THE INVENTION

This invention relates to a DC electrical measuring instrument of the radial flux gap type in which flux shunting pins and an overhanging pole piece cooperate to provide a linearized instrument scale and in which the coil is supported on a unitary frame which may be preassembled and thereafter assembled with the flux producing elements with minimum expense.

Figure 1:
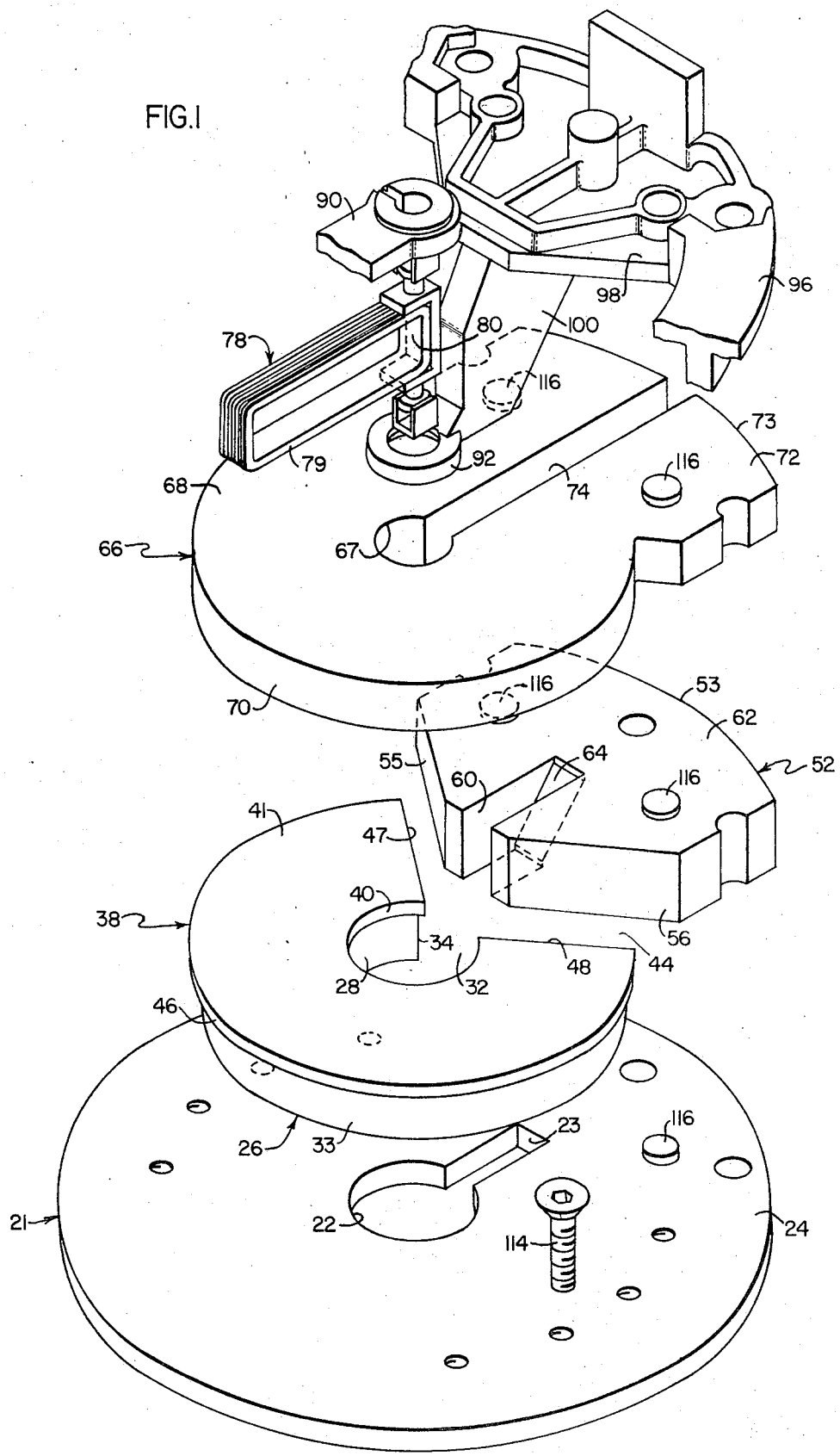
FIG. 1 is an exploded view illustrating an instrument structure embodying the invention.
Figure 3:
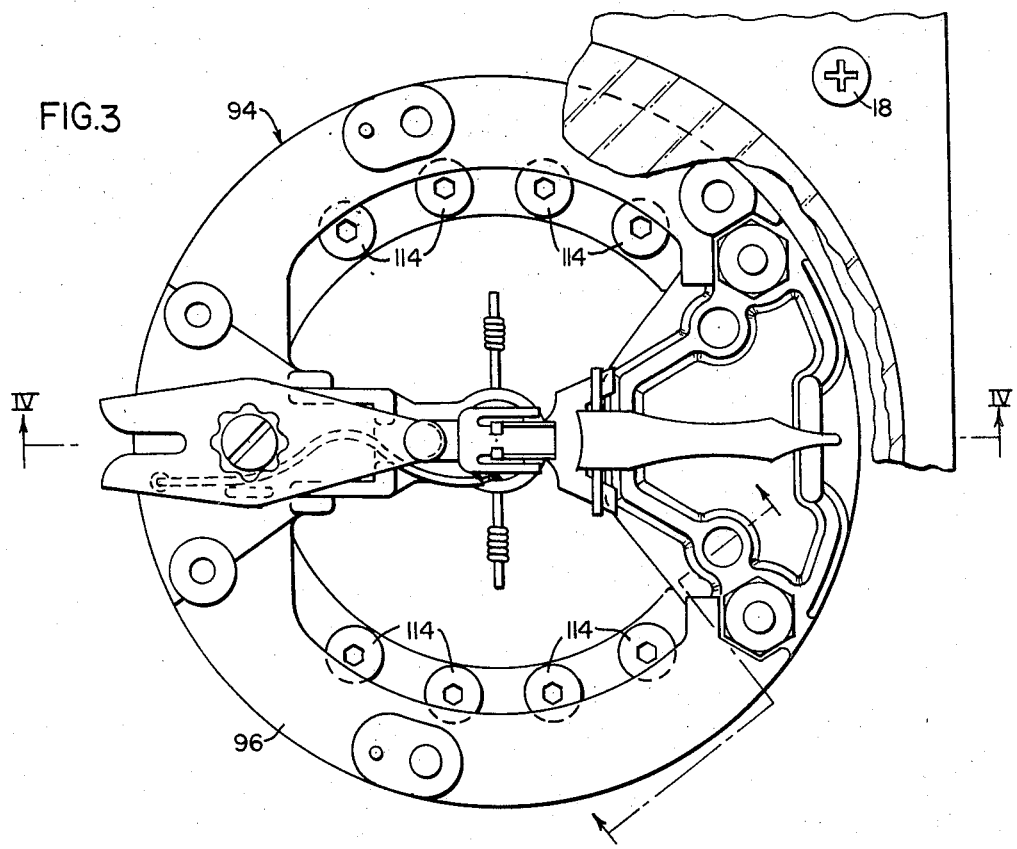
FIG. 3 is a partial plan view of the instrument illustrating certain features of the invention.

Referring to the drawings, by characters of reference and more particularly to FIG. 1 thereof, the numeral 1 indicates generally a circular scale instrument having a casing 2 with a flanged front wall 4 and a flanged rear wall 6. A cover member 8 closes the front wall and is provided with a transparent lens 10 for viewing the position of the pointer 12 relative to the calibrated dial plate 14. A gasket 16 seals the joint between the cover member 8 and flanged wall 4 and may be held thereagainst by means of a plurality of screws 18 (one only of which is shown in FIG. 3) located in the four corners of the rectangular cover member.

As illustrated in FIG. 1, the flux core assembly, generally designated 20, comprises a disk-like base member 21 of magnetic material such as a ferromagnetic material which has a central circular aperture 22 and a substantially rectangular slot 23 extending radially outwardly from the aperture 22. The central aperture 22 and slot 23 each open outwardly through the outwardly facing walls or surfaces 24 and 25 of the base member 21.

Figure 6:
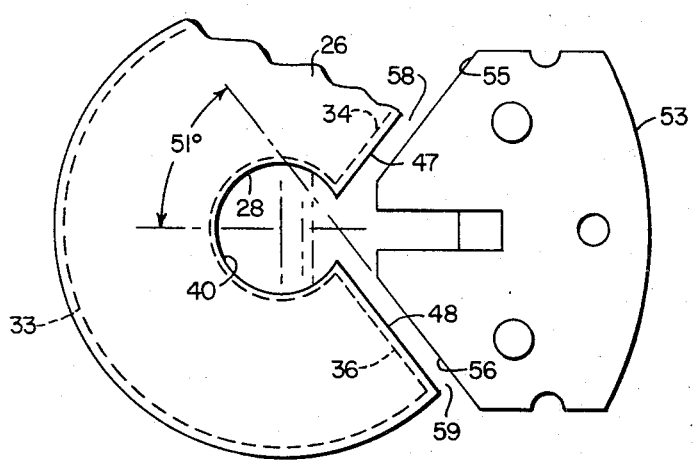
FIG. 6 is a partial view showing the interrelation of the magnet, the pole member and the flux block.

A disk-like permanent magnet 26 has a central aperture 28 opening outwardly through the outwardly facing surfaces 29 and 30. The magnet 26 has a sector-like aperture 32 opening outwardly through the circular periphery 33 and provided with end walls 34 and 36. The outwardly facing surface 30 of the magnet 26 seats against the outwardly facing surface 24 of the base member 21 and is suitably secured thereto as by an adhesive which may be a heat cured epoxy; the axis of the central apertures 22 and 28 being in alignment. A pole piece or member 38 is disk-like in shape and is provided with a central aperture 40 which opens outwardly through its outwardly facing surfaces 41 and 42. The pole member 38 like the magnet 26 is provided with a sector-like aperture 44 opening outwardly through its circular peripheral edge surface 46 and defined by the pole member end walls 47 and 48. The radius of the pole member is slightly greater than the radius of the magnet 26 as indicated in FIG. 6 to provide an overhanging lip 50, which, as illustrated, is of considerably lesser diameter than the base member 21. The central aperture through the base member 22 and 40 are of slightly less diameter than the aperture 28 in the magnet while the end walls 47 and 48 overhang the end walls 34 and 36 of the magnet. The pole member has its outwardly facing surface 42 seating against the outwardly facing surface 29 of the magnet and secured thereto by suitable means such as an adhesive which may take the form of a heat setting epoxy.

Figure 2:
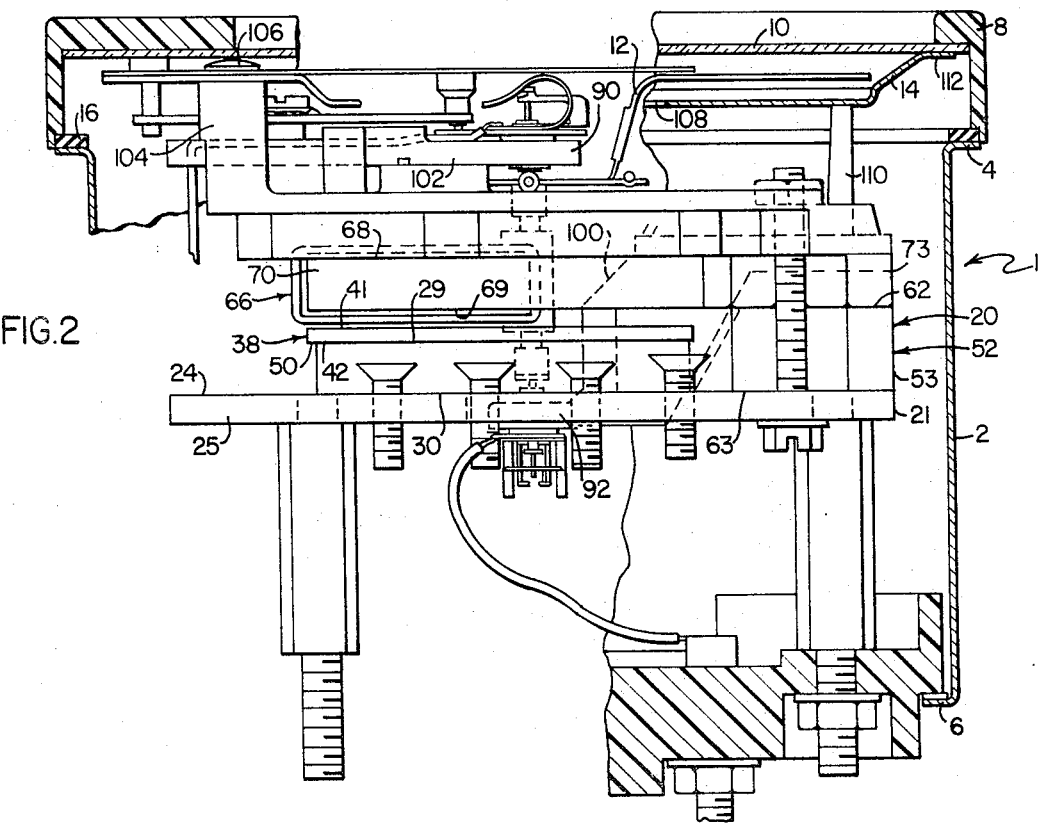
FIG. 2 is a view in elevation and partial section showing the instrument in assembled relation.
Figure 4:
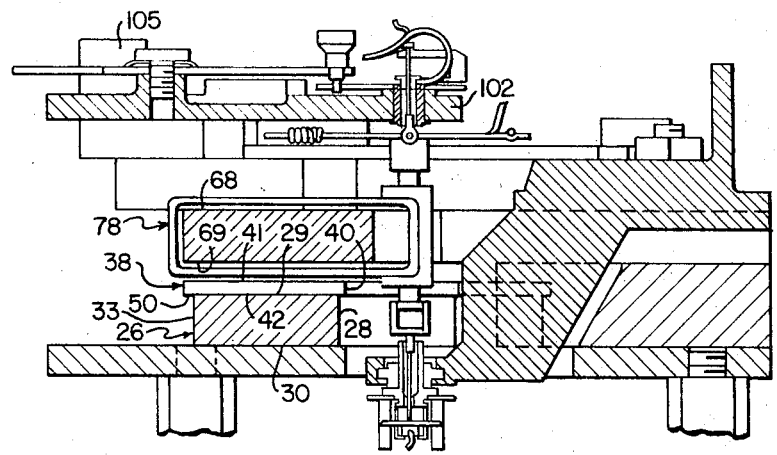
FIG. 4 is a sectional view taken substantially along the line of IV–IV of FIG. 3 and looking in the direction of the arrows.
Figure 5:
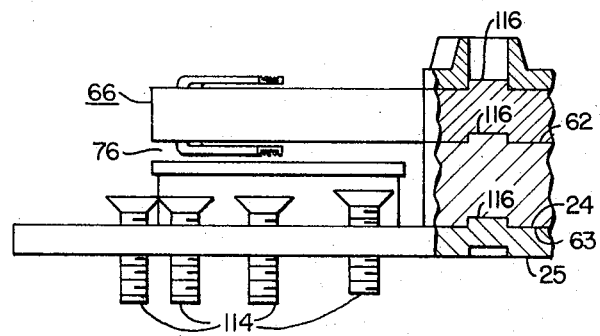
FIG. 5 is a view in partial section illustrating the locating devices which accurately position certain of the elements with respect to each other.

A flux block 52 of magnetic material is provided with an outer arcuate end wall 53, which, as indicated in FIG. 2, aligns with the outer circular surface of the base member 21 and is provided with a sector-like portion which extends into the sector-like apertures 32 and 44 of the magnet 26 and pole member 38. The acutely extending end walls 55 and 56 are spaced from the adjacent end of walls 47–34 and 36–38 respectively of the magnet 26 and pole member 38 to provide flux gaps 58 and 59. The flux block is provided with a slot 60 which opens outwardly from the flux block 52 between its end surfaces 55 and 56 and opens outwardly through the outwardly facing surfaces 62 and 63. The lower portion of the slot 60 is of the same size as the upper portion of the slot 23. However, the rear wall 64 of the slot 60 tapers outwardly so that the area of the slot 60 opening outwardly through the surface 62 is greater than the area of the slot opening outwardly through the surface 63.

A disk-like core member 66 has a central aperture 67 opening outwardly through its outwardly facing surfaces 68 and 69 and concentric with its circular peripheral surface 70. The core member is also provided with a supporting portion 72 which extends outwardly from the peripheral surface 70 and terminates in an arcuate surface 73 which aligns with the surface 53 of the flux block 52. The core member is also provided with a slot 74 which extends outwardly from the central aperture 64 and through the arcuate wall 73 and opens outwardly through the outwardly facing surfaces 68 and 69. The supporting portion 72 is carried by the upper surface 62 of the flux block 52 and the disk portion overlies the pole member 38 to provide a flux gap 76 therebetween. The core member 66 is positioned with the axis of its central aperture 67 in alignment with the axes through the apertures 28 and 40.

Figure 8:
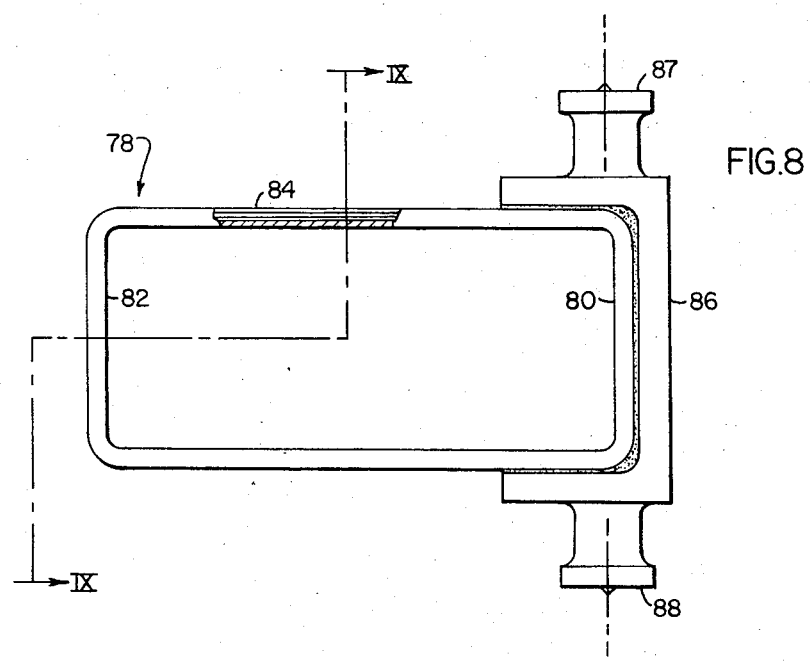
FIG. 8 is an enlarged view showing the coil member and a bobbin support therefor.
Figure 9:
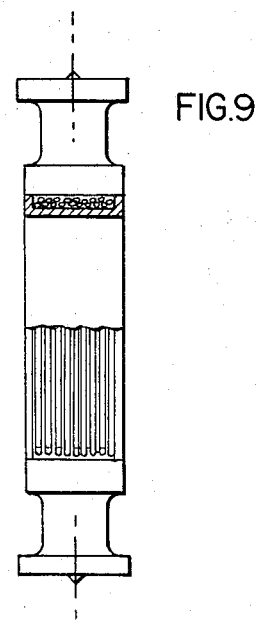
FIG. 9 is taken substantially along the line IX–IX of FIG. 8 and looking in the direction of the arrows; and, FIG. 10 is a view of modified form of a bobbin upon which the coil may be wound and which would be carried by the support.

A coil member 78 has one coil side 79 located within the flux gap 76 and a second coil side 80 located within the aperture 67. The coil member 78 comprises a substantially rectangular flanged bobbin 82 of aluminum or other non-magnetic material about which a coil of suitable wire which may be aluminum because of its lesser weight. The bobbin 82 is secured to a generally U-shaped support 86 by a suitable adhesive such as thermosetting epoxy. The support 86 is provided with outwardly extending necks 87 and 88 which are substantially circular in cross-section and have their axes aligned as indicated in FIG. 8. It will be apparent that the coil side 80 is substantially in alignment with the axes of the necks 87 and 88.

The coil member 78 is preferably suspended for rotational movement between a pair of taut bands substantially as shown, described and claimed in U.S. Pat. No. 3,111,623 to V. S. Thomander dated Nov. 16, 1963. The chief difference between the suspension as shown herein and the suspension of the Thomander patent is that the stationary ends of the taut bands hereof are held between two supporting portions 90 and 92 which are integral parts of a frame member rather than, as in the said Thomander patent, two members 13 and 15 which are not and cannot be moved as a unit to permit assembly of the coil member to the frame member independently of the remainder of the element of the Thomander mechanism.

The frame 94, as best illustrated in FIG. 3, comprises an annular part having a securing portion 98 which seats against the outwardly facing surface of the supporting portion of the core member 66. The core member 66 is provided with an extending portion 100 which extends downwardly through the slots 74, 60 and 23 and which is provided at its end portion with a first supporting portion 92. The frame 94 is provided with a second extending portion 102 which extends from a diametrically opposite part of the annular frame part 96 radially inwardly into the annular part and which carries the upper supporting portion 90. The frame 94 further includes a dial plate supporting portion 104 comprising a pair of spaced cylindrically shaped projections which are provided with slanted upper end surfaces against which the dial plate 14 is held by means of screws 106 screw threaded into each of the cylindrical portions 104. The dial plate is provided with a central aperture 108 through which the pointer 12 extends. The diametric opposite portion of the dial plate seats against the upper end portion of a post-like projection 110 and is held thereagainst by the screws 106 which hold the dial plate to the slanted upper end surface.

Figure 7:
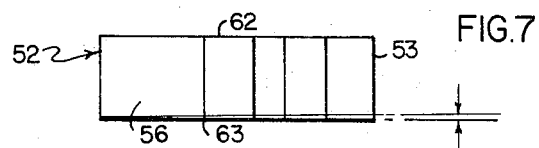
FIG. 7 is a view of the flux block indicating the non-parallel relation of its outwardly facing end surfaces to provide for the variable length of flux gap.

As illustrated in FIG. 7, the upper and lower surfaces 62 and 63 of the flux block 52 are not parallel but are tapered so that the core member which seats against the upper end surface 62 will cooperate with the upper surface of the pole member 38. This arrangement provides a flux gap, at the portion thereof remote from the flux block of a somewhat greater length than the length of the air gap at the portion of the core member adjacent the axis of rotation of the coil member 78. In the absence of the flux shunting screws 114 the difference in gap lengths will tend to provide a greater density of flux in the shortened length of the flux gap as compared to the longer length gap.

A plurality of flux shunting screws threaded into the base member 21 in spaced relation to the periphery of the pole member 38 and of the magnet 26 are provided to shunt sufficient flux from the magnet so that the flux density to which the coil side 79 is subjected will be substantially the same throughout the rotation of the coil member 78 and permits the pointer 12 which is movable therewith in the usual manner with the coil to cooperate with a linear scale calibration on the dial plate 14. As illustrated the screws 114 are provided with flared heads which have hexagonal apertures therein. The screws 114 may be screw threadedly moved upwardly and downwardly with respect to the base member 21 to shunt more or less flux from the pole member 38 to the base member 21 thereby decreasing the flux of the magnet which is available in the portion of the air gap adjacent to the flux shunting screws. As shown in FIG. 3, the screw holes are located radially with respect to the pole member 38 such that the heads when the screws are in their uppermost position will be adjacent to but spaced from the peripheral edge 46 of the pole member 38.

The members 21, 52, 72 and frame 94 are accurately located with respect to each other by means of circular abutments which are accurately formed on the members and which fit snugly within accurately framed recesses 118 in the members 52 and 72 and frame 94. By making the central apertures 22 and 40 slightly smaller in diameter than the aperture 28 in the magnet 26 and by providing the overhanging lip 50 and the overhangs along the edges 34 and 36 certain flexibility is permitted in the location of the magnet with respect to the pole member 38 and permits the use of more inexpensive cast magnets without the necessity of any machining thereof which is expensive. Also, with this arrangement, the pole piece may be cemented to the magnet and thereafter the subassembly may be located relative to the base member 21 by a guide pin extending through the lesser diameter apertures 22 and 40. These apertures 22 and 40, because of the nature of the steel from which the members 21 and 38 are made may be inexpensively and accurately machined. The cost of machining the steel as compared to the expense involved in grinding the magnet to bring it into tolerances sufficiently accurate to maintain a movement arm on the coil side 79 within satisfactory limits for precision indicating instruments is much less.

Figure 10:

FIG. 10 shows a modified form of bobbin in which damping resistance has been added thereto by the expediency of slots which alternately extend from opposite sides of the bobbin to provide a damping ring of greater resistivity.

It will therefore be apparent that there has been disclosed an improved direct current indicating instrument which is economical of manufacture and assembly and accurate in its ability to indicate the magnitude of the electrical quantity supplied thereto.

What is claimed and is desired to be secured by United States letters Patent is as follows:

1. An indicating instrument comprising a disk-like permanent magnet member, a disk-like pole member, each of said members having first and second outwardly facing surfaces and a peripheral surface, each of said members also having a central aperture opening outwardly through its said outwardly facing surfaces and having a sector-like aperture also opening outwardly through its said outwardly facing surfaces and opening outwardly through its said peripheral surface, a disk-like base member having a diameter greater than the diameter of said magnet member, said pole member having a diameter greater than that of said magnet member but less than that of said base member, means securing said first outwardly facing surface of said magnet member to said base member substantially concentrically thereof, means securing said first outwardly facing surface of said pole member to said second outwardly facing surface of said magnet member substantially concentrically thereof and with said sector-like apertures in substantial overlying relation, a flux block having non-parallel opposite surfaces, one of said opposite surfaces seating against said base member, at least a portion of said block being within said sector-like apertures, said block having end surfaces spaced from the walls of said sector-like apertures to provide a first flux gap, and a disk-like core member having first and second outwardly extending surfaces and a peripheral surface, said core member having a supporting portion extending outwardly from a portion of said peripheral surface, said core member having its supporting portion in engagement with the other of said non-parallel opposite surfaces of said flux block and having its said first outwardly extending surface spaced outwardly from said second outwardly extending surface of said pole member to provide a second flux gap therebetween which has a first portion of said second gap of greater length than a second portion of said second gap, and flux shunting means adjacent said second portion of said second gap to shunt a portion of said flux from said second portion of said gap.

2. The combination of claim 1 in which said flux block and said core member are provided with aligned slots, said core member having a central aperture opening outwardly of its said outwardly extending surfaces, said core member being positioned with its said central aperture in axial alignment with said central apertures of said magnet member and of said pole member, an independent self-supporting frame structure having a securing portion seated against and supported by said supporting portion of said core member, said frame structure including an extending portion projecting through said aligned slots, said extending portion being provided with a first coil supporting portion, said frame structure when seated against said supporting portion of said core member positioning its said first supporting portion in alignment with said central apertures on the side of said second gap away from said first surface of said pole member, said frame structure also including a second coil supporting portion, said frame structure when seated against said supporting portion of said member positioning its said second supporting portion in alignment with said central aperture outwardly of said second outwardly extending surface of said core member, a coil having a first coil side located in said second gap, and coil support means carried by said first and second supporting portions of said frame for supporting said coil side for rotational movement in said second gap.

3. The combination of claim 2 in which said frame structure includes an annular portion, said extending portion of said frame structure extending radially inwardly from a first peripheral portion of said annular portion, said second supporting portion of said frame being supported from a second portion of said annular portion which is substantially 180° displaced from said first peripheral portion.

4. The combination of claim 3 in which said second annular portion is provided with a dial plate support means, said support means having an outwardly facing dial plate engaging surface, said surface being slanted inwardly toward said core member, a dial plate having a central aperture, means holding said dial plate against said dial plate supporting surface and in a position in which its said central aperture overlies said central aperture of said core member, and an indicating pointer movable with said coil and having an indicating portion extending through said dial plate aperture, said dial plate having indicia, said indicating portion being cooperable with said indicia to indicate the rotation position of said first coil side in said second air gap.

5. The combination of claim 4 in which said first annular portion is provided with a second dial plate engaging surface, the slant of said slanting surface being dimensional relative to said second plate engaging surface such that when said dial plate is in engagement with said slanting surface said dial plate resiliently engages said second plate engaging surface to limit the movement of said dial plate toward said frame.

6. The combination of claim 2 in which said shunting means comprises at least two pin means of magnetic material, one of said pin means being located at a first peripheral portion of said magnet member adjacent said peripheral surface thereof near one edge of said sector-like aperture, a second of said pin means being located at a second peripheral portion of said magnet member adjacent said peripheral surface thereof near the other edge of said sector-like aperture.

7. The combination of claim 6 in which each said pin means comprises at least one externally screw threaded pin, each said pin being threadedly received in a threaded aperture in said base member, each said pin being provided with an enlarged head which when the said head is in the plane of said pole member is spaced from but is closely adjacent, a part of said peripheral surface of said pole member.

8. The combination of claim 6 in which each said pin means comprises a plurality of pins, said pins of said first pin means being positioned in peripherally spaced relation adjacent a first portion of said peripheral surface of said magnet member which extends therealong from said one edge of said sector-like aperture of said magnet member, said pins of said second pin means being positioned in peripherally spaced relation adjacent a second portion of said peripheral surface of said magnet member which extends therealong from said other edge of said sector-like aperture of said magnet member.

9. An electrical instrument comprising a plate-like base member of magnetic material having a supporting portion, a disk-like permanent magnet having spaced outwardly facing walls and a peripheral portion which is generally circular about an axis, said peripheral portion being less than 360° whereby said magnet has spaced end walls substantially defining a sector shaped opening, said magnet having one of its said side walls secured to said base member and having said sector opening registering with said supporting portion, a disk-like pole member of substantially the same shape as said magnet, said pole member having a radius which is greater than that of said magnet to provide a peripherally extending overhanging lip, said pole member being secured to the other of said magnet side walls and having its said sector shaped opening aligned with said sector shaped opening of said magnet, a disk-like core member having an elongated aperture and having a circular peripheral portion which is generally circular about an axis located within said core member aperture and having a supporting portion located at a first side of its said axis, a flux block supported on said supporting portion of said mounting member, said flux block having a sector-shaped portion extending into at least one of said sector-shaped openings of said pole piece and said magnet, means securing said supporting portion of said core member to said extending portion of said flux block and with the disk-like portion of said core member in spaced overlying relation with said pole member to provide flux gap, a self-supporting rotor carrying member having a mounting portion, means securing said mounting portion of said rotor carrying member to said core member, said rotor carrying member including a first rotor supporting portion, said rotor carrying member having a part thereof extending through said aperture of said core member, said rotor carrying member including a second rotor supporting portion, and a rotor supported for rotational movement between said first and second rotor supporting portions, said rotor comprising a first coil side located for movement in said flux gap and a second coil side extending through said core member aperture and aligned with said axis.

10. The combination of claim 9 in which said magnet and said pole member each having a central aperture therethrough, said apertures in said magnet and said pole member being concentric with said axis, said flux block having an elongated aperture opening outwardly therefrom toward said apertures in said magnet and said pole member, said part of said rotor carrying means extending into said aperture in said flux block, said second rotor supporting portion being carried by said part and spaced on the side of said pole member away from said flux gap.

11. The combination of claim 10 in which said base member has a central aperture therethrough aligned with said axis and a peripheral outer surface circular about said axis, said base member having a radially extending aperture opening outwardly from its said central aperture, said radially extending aperture being aligned with said flux block aperture, said rotor carrying member part extending into said radially extending aperture, and said second rotor supporting portion being in said central aperture.

12. An instrument of the character described comprising a plate-like permanent magnet having first and second outwardly facing spaced surfaces joined by at least a section of a circular peripheral wall, said magnet being polarized in a direction to make one of said surfaces positive and the other thereof negative, a first flux conducting member adjacent said first surface, a second flux conducting member spaced from and non-parallel to said second surface to provide a flux gap having portions of lesser and greater length, flux conducting means joining said flux conducting members and spaced from said magnet, and a plurality of flux conducting screw threaded pins threadedly carried by said first member adjacent said circular wall and adjacent said portion of said gap having said lesser length, said pins being movable toward and away from said second surface to determine the magnitude of the flux shunted thereby from said second to said first magnet surface.

13. An instrument of the character described comprising a substantially disk-shaped permanent magnet having first and second spaced outwardly facing surfaces and a peripheral surface, said magnet having a circular central aperture and a sector-like aperture, said apertures opening outwardly through said outwardly facing surfaces, said sector-like aperture extending outwardly from said central aperture through the peripheral surface of said magnet, said magnet being polarized in a direction extending between said outwardly facing surfaces, a frame, a base member of magnetic flux conducting material carried by said frame and of a cross-sectional area greater than the cross-sectional area of said magnet, said first end surface of said magnet being in intimate relation with said base member and having its first said end surface in flux conducting relation therewith, a disk-shaped pole member having first and second spaced outwardly facing surfaces and a peripheral surface, said pole member having a circular central aperture and a sector-like aperture opening outwardly through its said outwardly facing surfaces, said sector-like aperture of said pole member extending outwardly from said central aperture of said pole member and through the peripheral surface of said pole member, said first end surface of said pole member being in intimate relation with said second outwardly facing surface of said magnet, said pole member being positioned with the axis of its said circular aperture in alignment with said axis of said circular aperture of said magnet and with its said sector-like aperture overlying said sector-like aperture of said magnet, said pole member having a greater cross-sectional area than said magnet whereby its said peripheral surface overhangs said peripheral surface of said magnet, said circular aperture of said pole member being of lesser diameter than said circular aperture of said magnet whereby said pole member overhangs said circular aperture of said magnet, said sector-like aperture of said pole member being of lesser cross-sectional area than the cross-sectional area of said sector-like aperture of said magnet whereby said pole member overhangs said sector-like aperture of said magnet, a flux block of magnetic flux conducting material having first and second spaced outer surfaces and first and second edge surfaces, said edge surfaces extending at an acute angle relative to each other, said flux block having its said first outer surface in engagement with said base member and its said edge surfaces extending into said sector apertures in spaced relation to said magnet and said pole piece, said flux block extending outwardly from said base member and beyond the plane of said second end surface of said pole member, a disk-like core member having first and second outwardly facing surfaces and a peripheral surface, said core member having a supporting lip extending outwardly of its said peripheral surface, said core member having a circular aperture opening outwardly of its said outwardly facing surfaces and centrally of its said peripheral surface, said core member having a radial aperture opening outwardly through its said outwardly facing surfaces and extending outwardly of its said circular aperture through said lip, said second end surface of said flux block being non-parallel to the plane of said second outwardly facing surface of said pole member, means supporting said core member on said second end surface of said flux block with its said first outwardly facing surface overlying and spaced from said second outwardly facing surface of said pole member to provide a flux gap therebetween having portions of lesser and greater length, said core member being supported relative to said magnet such that the dimension of said flux gap portion at the portion thereof spaced most remotely from said flux block is greater than the dimension of said flux gap nearer said flux block, a unitary coil supporting device carried in fixed position relative to said frame and having first and second relatively arranged coil supporting portions aligned with said axes of said circular apertures, said first coil supporting portion being located on one side of said gap and said second coil supporting portion being located on the other side of said gap, a coil having a coil side located in said flux gap, means supporting said coil on said coil supporting portions for rotation of said coil in said flux gap, and at least one flux shunting member carried by said base member adjacent said portion of said gap of lesser length and extending therefrom toward said peripheral surface of said pole member.

* * * * *